United States Patent [19]

Boulay

[11] Patent Number: 5,161,242
[45] Date of Patent: Nov. 3, 1992

[54] AUTOMATED REPEATING SEXTANT (ARS)

[76] Inventor: Peter C. Boulay, 1492 Roundleaf Ct., Reston, Va. 22090

[21] Appl. No.: 300,842

[22] Filed: Jan. 24, 1989

[51] Int. Cl.$^5$ .......................... G01C 21/02; G01S 5/08
[52] U.S. Cl. ...................................... 364/455; 33/268; 356/145; 356/146; 364/443
[58] Field of Search ............... 33/1 SC, 268, 281, 282, 33/; 356/141, 145, 146, 147; 364/455, 443

[56] References Cited

U.S. PATENT DOCUMENTS

| | | | |
|---|---|---|---|
| 3,194,949 | 7/1965 | Jasperson | 33/268 X |
| 3,245,147 | 4/1966 | Wright | 33/268 X |
| 3,370,460 | 2/1968 | Haake et al. | 33/268 X |
| 3,491,228 | 1/1970 | Selvin | 364/455 X |
| 3,713,740 | 1/1973 | Lillestrand et al. | 356/141 |
| 3,854,037 | 12/1974 | Feldman et al. | 364/455 |
| 3,968,570 | 7/1976 | Leuchter, Jr. | 33/268 X |
| 4,005,938 | 2/1977 | Ho | 33/283 X |
| 4,082,462 | 4/1978 | Owen | 356/141 X |
| 4,104,722 | 8/1978 | Evans | 33/268 X |
| 4,162,124 | 7/1979 | Feldman et al. | 356/141 X |
| 4,197,653 | 4/1980 | Laxo | 33/282 X |
| 4,428,671 | 1/1984 | Davies | 33/282 X |
| 4,454,583 | 6/1984 | Schneiderhan et al. | 364/449 |
| 4,470,119 | 9/1984 | Hasebe et al. | 364/449 |
| 4,680,718 | 7/1987 | Sasaki et al. | 364/434 X |
| 4,702,011 | 10/1987 | Sigley | 33/268 |
| 4,707,926 | 11/1987 | Decker, Jr. | 33/267 |
| 4,763,418 | 8/1988 | Decker, Jr. | 33/268 |
| 4,819,053 | 4/1989 | Halavais | 342/353 |
| 4,903,212 | 2/1990 | Yokouchi et al. | 364/443 X |
| 4,944,587 | 7/1990 | Harigae | 356/141 X |

FOREIGN PATENT DOCUMENTS

| | | |
|---|---|---|
| 3122901 | 12/1982 | Fed. Rep. of Germany . |
| 2599140 | 11/1987 | France ................. 33/281 |
| 63-3241415 | 10/1988 | Japan ................. 33/268 |
| 1353285 | 5/1974 | United Kingdom ........ 33/268 |
| 2101060 | 1/1983 | United Kingdom . |

OTHER PUBLICATIONS

"Celestial successor to inertial guidance" by Farrell et al; Electronics Magazine vol. 39 No. 6; Mar. 21, 1966; pp. 115–124

Primary Examiner—Parshotam S. Lall
Assistant Examiner—Edward R. Cosimano
Attorney, Agent, or Firm—Burns, Doane, Swecker & Mathis

[57] ABSTRACT

The automated repeating sextant (ARS) is a navigational instrument suitable for air, sea and land use. The ARS uses an electronic artificial horizon, an A/D conversion board and either microchips or a computer, with software, to read a celestial body's altitude above the horizon repeatedly in a brief period of time, and then compute a line of position from a statistically enhanced mean altitude; after a second or any successive line of position has been obtained the instrument either provides the latitude and longitude of the navigator, or combines the latitude and longitude with a graphic portrayal of the position on a simplified grid map. The instrument averages numerous individual observations and is relatively small, light and fast. The ARS may be embodied in a fully automated, continually-operating mode with a micro-computer, or may be embodied in a handheld version that is switched on and off. The body sighted by the ARS may be either a natural celestial body (sun, moon, navigational planet or navigational star) using light wave signals, or an artificial celestial body (manmade satellite), using radio frequency signals.

38 Claims, 4 Drawing Sheets

AUTOMATED REPEATING SEXTANT (ARS)

BACKGROUND OF THE INVENTION

1. Field of the Invention

The present invention relates in general to navigational instruments and more specifically to sextants and other instruments used in celestial navigation.

2. Prior Art

Celestial navigation depends on the ability to obtain a precise measurement of the altitude of a celestial body above the viewer's horizon at a precise moment in time. From this datum, called the sextant altitude, the navigator's line of position (LOP) may be calculated. To perform this calculation it is necessary to algebraically subtract the sextant altitude from the calculated altitude of the body, which may be obtained by applying formulae from the *Almanac for Computers* or by computing them from tables. From two or more observations of different celestial bodies, the point at which two or more LOP's cross is the fix, or position. In the past, the sextant used to determine the altitude of the celestial bodies has usually been a handheld device consisting of a telescope, a mechanical arm, two mirrors, and a rigid arc. In normal usage, the navigator sights the horizon through the telescope and simultaneously sights the celestial body by means of the mirrors, adjusting a movable arm along the arc until the celestial body appears to align with the horizon, and then noting the angle as indicated by the graduation marks on the arc.

Improvements to the basic sextant are known, which increase its precision, automate the timing of an observation, read the angle electronically, combine with a computer to plot position, or average a number of individual observations to improve accuracy and precision. However, there is no known device which comprises an electronic artificial horizon, an automatic segmented diode device for sighting and identifying the celestial body, plus microchips and software that are capable of averaging multiple observations and plotting a fix; nor is there any known electronic device which controls precision of individual altitude measurements by switching power off and on depending on how closely the instrument is trained on the target celestial body; nor is there any known device which performs navigational functions by averaging the direction of radio waves from artificial satellites for which the ephemerides are known.

There is known to be a device called an Electronic Sextant (Laxo, U.S. Pat. No. 4,197,653), but this device requires the navigator to take a conventional sextant reading, in which a mechanical arm is moved along an arc.

There is also known to be a device termed a Passive Optical Rangefinder-sextant (Barton, U.S. Pat. No. 4,162,124), but such device has neither an electronic artificial horizon nor an averaging capability.

There is also known to be an Automatic Space Sextant (Owen, U.S. Pat. No. 4,082,462), but such device requires two telescopes and uses generated time pulses from a momentum wheel to provide an angle between the two bodies. This device is designed solely for space use and has neither an electronic artificial horizon nor accompanying software to statistically enhance readings and to display the fix.

There is also known to be a Horizon Indicating Device for Marine Sextant (Ho Shiaw-Lei, U.S. Pat. No. 4,005,938), but this device provides a mechanical horizon finding device, not an electronic artificial horizon.

There is also known to be an Electronic Sextant (Leuchter, U.S. Pat. Nos. 3,968,570) and an Automatic Sextant (Decker, 4,763,418 and Decker, 4,707,926), which does not provide an electronic, artificial horizon nor statistically enhance numerous individual observations—taken either automatically or in a handheld mode—nor provides position information on a video display terminal.

There is also known to be a Sextant Having a Microprocessor for Calculating the Position of Heavenly Bodies (Sigley, U.S. Pat. No. 4,702,011), but such device uses a conventional prior art sextant without an artificial electronic horizon. Such device also differs from the present invention in that it cannot be operated in a fully automated mode.

There is also known to be an Optical Device for Vertically Positioning a Sextant (Davies, U.S. Pat. No. 4,428,671), but said device is designed solely to minimize tilt error which the present device accomplishes, when necessary, by provision of a second inclinometer mounted cross-axis to the first inclinometer.

In addition, there are known to be inventions which determine a vehicle's position based on radio frequency signals, or in which a visual display of the heading and position is provided on a terminal (Schneiderhan et al., 4454583), but there is no known device that provides heading, position and other navigational information on a display terminal when the information is derived from celestial navigation or by averaging numerous individual observations (of light or radio wave signals).

There are also known to be inventions (Haefner, German Patent Document No. 3122901) which digitize map information for navigational purposes, or which solve (Cadoux, British Patent Document No. 2101060) navigational problems, but there are no known devices which perform these tasks in conjunction with data that derives from celestial objects or which has been statistically enhanced from numerous individual observations.

There are also known to be devices for providing map information for a moving land vehicle (Hasebe, U.S. Pat. No. 4,470,119), but there are no known devices which provide such information deriving from continuous position fixes from celestial objects or from radio frequency sources.

There is also known to be a device for calibrating an aircraft's heading system by reference to a celestial body (Wright, U.S. Pat. No. 3,245,147), but said device is of a mechanical nature and does not provide the automated features of the ARS.

No device is known for combining in a single instrument an electronic means of providing an automatic angle reading capability by use of an electronic inclinometer plus an electronic averaging method combining a microchip and software. In addition, there is no known device for completely automating the sextant by providing for a fixed position sextant which combines an electronic artificial horizon, soft ware that recognizes celestial bodies and measures their altitude, as well as performing sight reduction functions and displaying results on a video display terminal. Nor is there known any type of sextant which is self calibrating, or that is combined with software to statistically improve numerous individual altitude readings. Nor is there any known sextant which combines with software to read a vehicle's or a craft's instruments, thereby providing the capability of displaying position, course, speed and attitude information on a video display terminal.

SUMMARY OF THE INVENTION

This invention relates to an Automated Repeating Sextant (ARS) useful for land, sea and air navigation. A preferred embodiment includes an electronic artificial horizon in the form of an inclinometer, a signal capturing and identification device which may be either a lens and accompanying diode field, or a loop antenna and radio frequency signal receiver, plus a digitizing device in the form of an analog/digital conversion board, plus either a microcomputer with accompanying software or programmed microchips. The device is trained in the direction of a signal from either a natural celestial body or a manmade satellite and the inclinometer which is attached to the device transmits an electric signal through the analog/digital conversion board, to the computer or microchips. The signal is converted by software to an angular reading, thus giving the altitude of the sighted body above the viewer's horizon. This process is repeated numerous times in a brief period of time. A line of position is then calculated from the mean altitude of the observations, and the vehicle's position is plotted and displayed on a grid map after a second celestial object has been similarly observed.

A general object of the present invention is to provide an automatic repeating sextant that can be used for land, sea and/or air navigation.

BRIEF DESCRIPTION OF THE DRAWINGS

FIG. 5 shows a flow chart of steps which can be used to obtain a navigational fix using an exemplary preferred embodiment of the present invention.

DETAILED DESCRIPTION OF THE INVENTION

A present invention provides a highly accurate position fix by partially automating or fully automating the sighting and sight reduction tasks of the navigator. In exemplary embodiments, this is accomplished through repetitive sightings of a celestial body such as a natural body or a manmade satellite, and then statistically enhancing the observations, digitizing them in the process.

A plotting of the position on a chart is automated as an integral part of the sextant's operation.

The present invention provides such a device which can be used in overcast conditions, relying on radio frequency signals from satellites or other sources instead of light waves from celestial bodies, and statistically enhancing them in a similar manner.

The present invention to provides such a device which is of simple, inexpensive construction.

The present invention is provides such a device that is small and lightweight and which does not require mechanical manipulation.

A device is described which will give the altitude reading very quickly or will convert the altitude reading to a position fix and plot the fix on a chart very quickly.

Further a navigational instrument is described that is self-contained and not dependent on transmitted waves from support equipment on the ground or emanating from artificial satellites (except that in the radio-frequency embodiment of the invention artificial satellite signals are received for the sole purpose of obtaining their azimuth and altitude).

The present invention provides an electronic means of minimizing tilt error by use of a second inclinometer, mounted cross-axis to the first inclinometer, which is capable of being programmed to cut power to the first inclinometer if cross-axis tilt exceeds a certain angular amount, thereby improving accuracy by permitting only those observations made with no cross-axis tilt, or only a pre-programmed, acceptable level of tilt, to be used in the sight reduction and position plot.

Further, the present invention provides an extremely low cost alternative usage of the Global Positioning System, with very favorable accuracy, by capturing radio-frequency signals from said satellites repeatedly and using an inclinometer to determine azimuth, as well as a microcomputer to calculate altitude and thus the line of position. This usage does not require the more expensive receivers/calculators used by the GPS, nor does it require access to the special use codes, designed principally for military usage, necessary to attain the ultimate accuracy which the GPS can offer.

In a preferred embodiment, a sextant consists, of a small dome attached to the fuselage of an aircraft, or mounted on the cab of a land vehicle, or on the steering house of a ship or boat. Within this dome is a wide angle focusing lens and, on a focal plane below the lens is a segmented diode or series of diodes which are photosensitive. These diodes provide an electrical signal proportional to the focused light falling on them after passing through the lens. The diodes thus signal the direction from which a celestial body's light comes, relative to the center of the telescope's field. An inclinometer is attached to the diode bank, and its electrical signal is directly proportional in a linear manner to its angle above or below the true horizon. As the light from the sun or another celestial body falls upon the lens, and then on the diode bank, the intensity (magnitude) of the light indicates that the celestial object is, for example, the sun. The angle of the sun from the center-of-field of the lens is measured by means of the signal from the diode field. In turn, the angular variance of the plane of the diode field from true horizontal is measured by the inclinometer. Thus, the sun's altitude above the true horizon is derived. In the case of the moon or Venus or the brighter navigational stars, magnitude may also be used to identify the celestial object. In the case of stars whose magnitude is less than a certain magnitude, —2 for example, the star is instead recognized by a geometric pattern, as in the known "w" shape of the constellation Cassiopeia, which contains the navigational star, Schedar.

In this preferred, fully automated embodiment, the ARS calculates the LOP based on the altitude of the known body, identifies another body and repeats the process. For each body, numerous individual altitude readings (in the form of voltage readings from the inclinometer) are averaged or otherwise statistically enhanced, for example, by accepting only those within one standard deviation from the mean, or by Kalman filtering. The signal from the inclinometer and from the photosensitive diodes is electronically transferred to a microchip or a microcomputer, passing through an analog-digital (A/D) conversion board. The software then converts these digitized sextant altitudes for two or more celestial bodies to LOP's, plots them on a video display terminal over a simplified grid map of the area in which the vehicle is operating, and also displays the latitude and longitude. In the preferred embodiment, the display includes a blinking cursor in the shape of the vehicle (car, truck, airplane, ship, etc.) or person. During the time between fixes, the software advances the cursor on the screen in the direction of true course, at groundspeed. The method by which this is done is the standard method used in sextant sight reductions; the operator inputs an assumed position in latitude and longitude, or the microcomputer uses the last computer fix, and the software calculates a position using formulae from the *Almanac for Computers*. This calculated altitude is compared to the sextant altitude and the difference is the basis for plotting the LOP. The cursor is advanced in the direction of true course, at groundspeed, based on data supplied either by the navigator or by a direct reading of the craft's instruments. In addition, based on the foregoing calculations the wind speed and vector and, if applicable, water current vector and speed, may be calculated as well and displayed.

In another embodiment, the ARS is a handheld instrument with a small telescope which is pointed by the navigator at a known celestial body. The inclinometer measures the angle from the horizon repeatedly during an observation and the average of these separate observations is taken, statistically refined by Kalman filtering or by calculating the standard deviation from the mean an subtracting those observations which vary from the mean by more than one standard deviation, then recomputing the mean and using the recomputed mean as the sextant altitude. In this handheld embodiment, the output may be the latitude and longitude displayed on a calculator-type light-emitting diode display or liquid crystal or other type of display, instead of the video display terminal, in order to provide maximum portability and minimum size and weight.

For both the stationary, preferred embodiment and the handheld version of the ARS, the accuracy derives from the averaging or other statistical filtering of numerous individual observations during the one or two second period of a sighting. Using the same processes described above, the sextant is also capable of self-calibration, in that the instrument may take an observation of a celestial body while precisely located at a known position (such as the end of a runway at an airport). If the instrument shows a variance from the true position, the software permits the operator to accept the variance, thus calibrating the instrument. In addition, for the handheld embodiment, which uses a small telescope for sighting the celestial body, a series of photosensitive diodes may be placed on the focal plane at a distance from the center of the field, so that if the image of the celestial body is not close enough to the center to permit accurate sighting, the instrument is switched off by the diodes. Thus, in a given one-second observation during which the navigator's hand may wobble slightly, the instrument may be switched off and on several or many times and only the "good" observations will be recorded, statistically improved, and used in the plot. Such a sextant is capable of being used in airplanes, on ships and boats, in cars, trucks, buses, tanks and trains, and by land crews engaged in survey work or soldiers in the field, or other work requiring a precise location. When the ARS is used on land, a fix can be obtained from observation of a single body since the fix will be the point at which the first LOP transects the highway, creek, railroad track or other landmark.

In another embodiment, the sextant may be used to sight a satellite, including but not limited to the Global Positioning System (GPS) satellites, for which the ephemerides are known. In this embodiment, the ARS substitutes a direction-finding loop antenna and radio frequency (RF) receiver for the telescope and diode bank. It reads numerous low-accuracy RF signals repeatedly over a brief period of time, statistically filters them through the software, and arrives at the LOP in a similar manner to that of the preferred embodiment. Because the ARS uses the mean of many disparate signals (either of light waves or of radio waves) it has the capability of providing LOP's that are far more accurate than those provided by any known sextant. The accuracy can be increased by either lengthening the sighting period to obtain more signals, or increasing the speed of the analog/digital conversion board and the microchips that control the process, to the point where the signal to noise ratio prevents further improvement.

Figure 1:
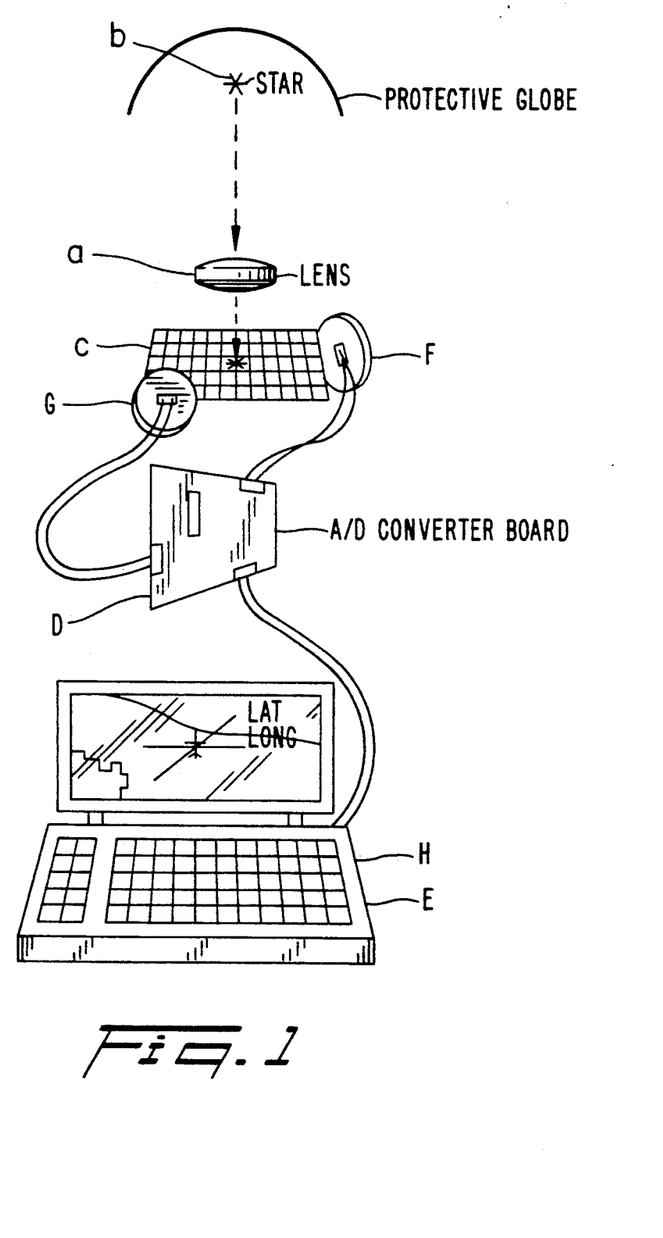
FIG. 1 shows light from a celestial body passing through a lens and falling on a diode field, which transmits an electrical signal indicating the angular direction of the light from the center-of-field of the lens, while an electrical signal from the attached inclinometer indicates the angular distance of the center-of-field of the lens from the true horizon.

Refer now to FIG. 1, which is an overall drawing of a preferred embodiment of the invention. This drawing shows an ocular wide-angle lens A through which light from one or many celestial bodies B passes to a diode field C. The diode field is either a single, segmented photosensitive diode or a group of diodes such as photosensitive diode arrays or CCD (charge-coupled device) arrays. Electrical signals are generated wherever light falls within this field, and the signals are digitized by an A/D converter board D. The digitized signals are analyzed by computer software E. The software first identifies a particular celestial body by intensity of the signals for the sun, the moon or the navigational planets and by geometric pattern for stars. A first inclinometer F provides an electrical signal which is linear, and which is directly proportional to the inclinometer's variance from the horizontal. A second inclinometer G performs the same task, but is mounted cross-axis to the first inclinometer. The first inclinometer measures pitch and the second measures roll. The signals from the inclinometer are digitized by means of the A/D converter board and are used to measure the attitude of the vehicle at the time of an observation. The computer H analyzes the diode field signals and determines the sighted body's angular distance in degrees from the center of the lens field, and computes from this and from the inclinometer's attitude readings, the degrees above the horizon of the celestial body. The computer is also used to provide the time of the beginning and ending of the observation. This cycle is constantly repeated. At the end of a certain number of cycles, or at the end of a period of time determined by the operator (usually a second), the computer adds and averages the individual voltage readings, converts them to degrees by dividing by the scale factor (which in the preferred embodiment is one degree to 60 millivolts), which provides a sextant altitude (HS), computes the mean time of the observation, and performs a standard sight reduction by comparing (HS) to the computed altitude (HC)—a figure that is calculated during each observation by the software, by obtaining data from the *Almanac for Computers* from its memory and using the standard, full-length Chebyshev formulas from the *Almanac for Computers*.

Figure 2:
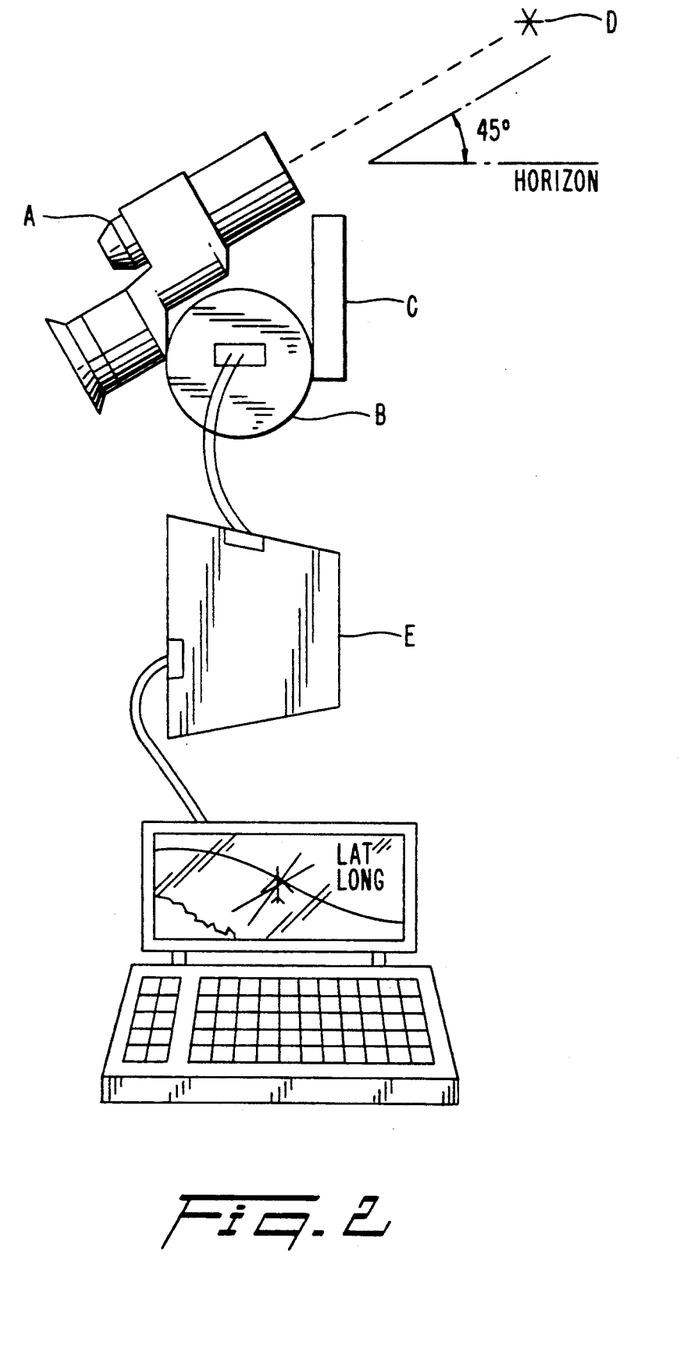
FIG. 2 shows a handheld version of the ARS, in which a small telescope is mounted on a first inclinometer at a positive 45 degree angle to the horizontal, and a second inclinometer is mounted cross-axis to the first in order to provide a tilt reading and switch power off if tilt is greater than desired.

Refer now to FIG. 2, which is an overall drawing of another embodiment of the invention. This drawing shows the handheld version of the ARS, in which a small telescope J is mounted on the first inclinometer F at a positive 45 degree angle to the horizon. A second inclinometer G is mounted cross-axis to the first inclinometer to provide a tilt reading and to switch power off should the tilt angle exceed a programmed amount. As described previously, a photosensitive array, such as a diode field, encircles a center of the focal plane of the telescope and shuts off power to the first inclinometer when the image of a celestial body falls outside a desired area in the field of view. The navigator sights the telescope at a celestial body B and the signal from the first inclinometer is digitized by the A/D board D. During a brief period of time, usually a second, continuous readings are thus taken and the digitized readings from the first inclinometer are added. The timer in the computer H marks the beginning and end of the observation and later determines the mean time of the observation. The average of the digitized voltage readings is computed and, if desired, statistically enhanced by computing the standard deviation from the mean and discarding individual observations that exceed one standard deviation from the mean, and then recomputing the mean. The final mean is converted to degrees in the same manner as above, and the sight reduction and line of position are plotted on a simplified grid map, as in the first drawing, and, after a second or any successive observations, a fix is determined and plotted.

Figure 3:
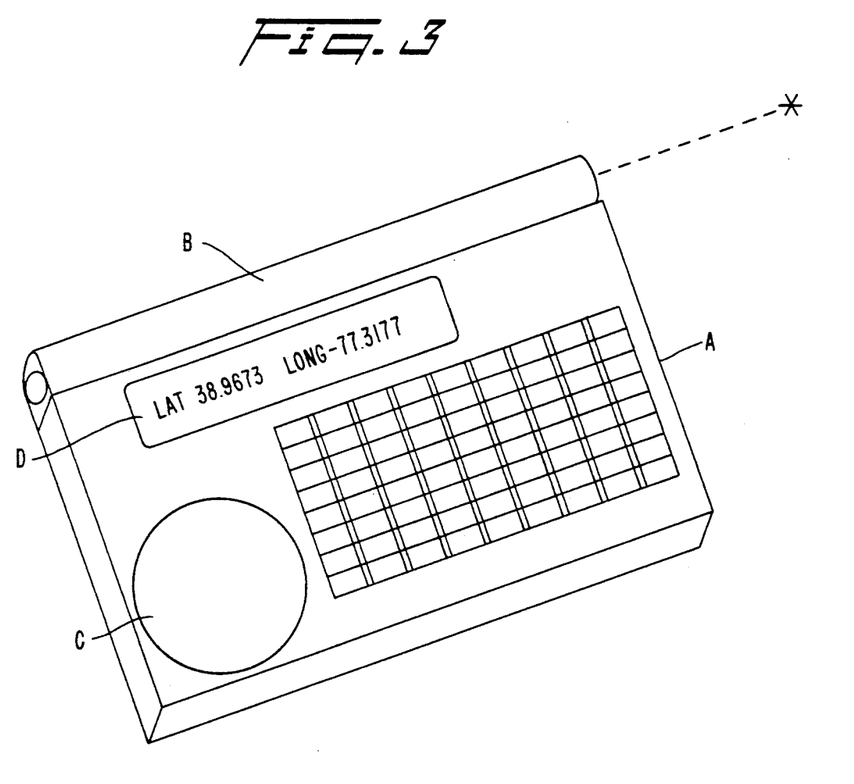
FIG. 3 shows another handheld version of the ARS which comprises a handheld, programmable calculator with programmed ephemerides for certain celestial bodies, and a program including the sight reduction formulae from the *Almanac for Computers*.
Figure 4:
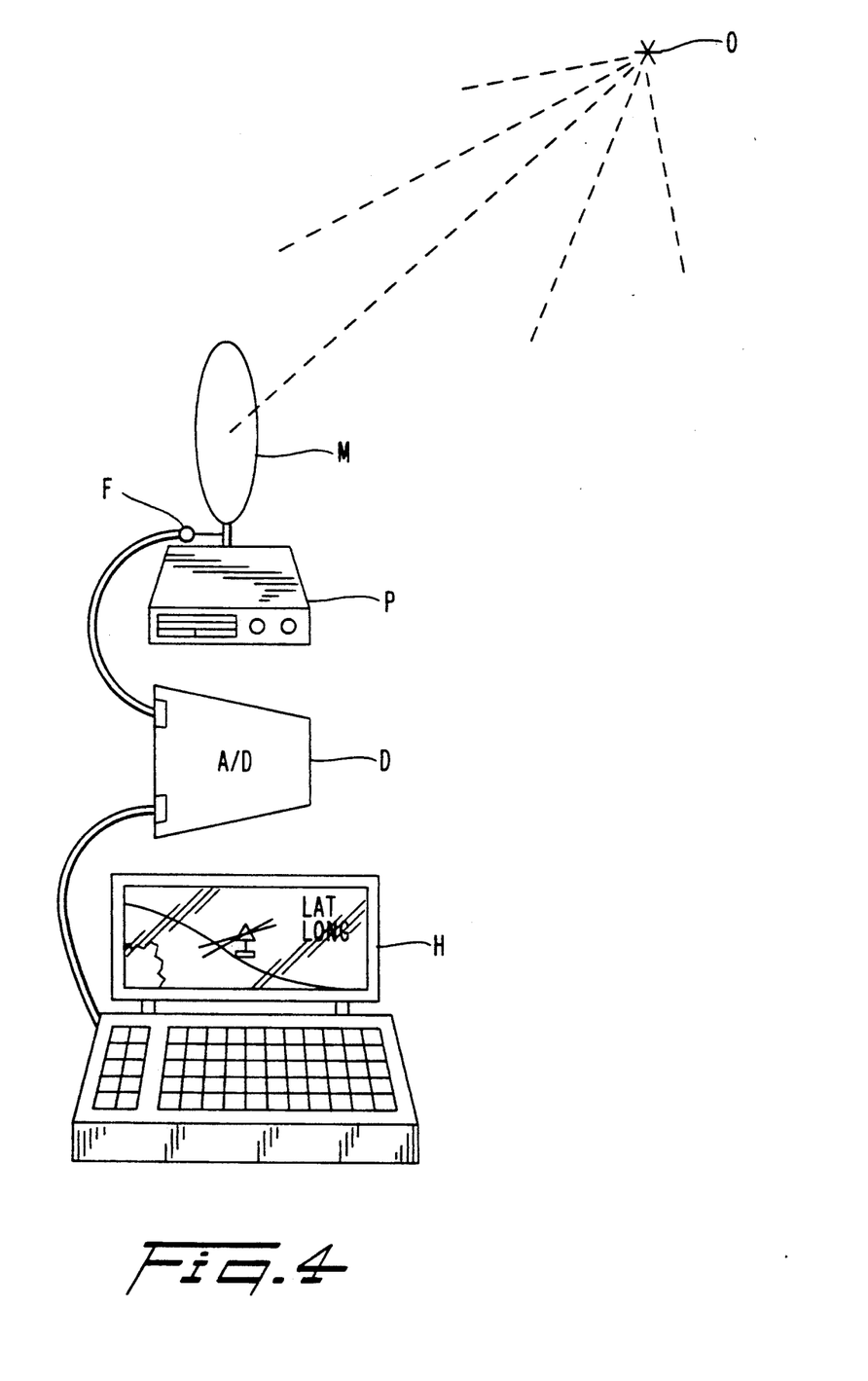
FIG. 4 shows a fully automated version of the ARS in which a loop antenna is used to determine the azimuth and altitude of a radio frequency signal from a manmade satellite for which the ephemerides are known, providing an alternative usage for the satellite.

Refer now to FIG. 3, which is an overall drawing of another embodiment of the invention. This drawing shows another handheld version of the ARS which comprises a handheld calculator L programmed with ephemerides for certain celestial bodies, and the sight reduction formulae from the *Almanac for Computers*. A telescope J is built into the calculator, and an inclinometer F is also built into the ARS. The unit operates in the same manner as the more fully automated versions, except that the line of position is expressed on the calculator's LED K display as the difference between the sextant altitude and the calculated altitude, plus the azimuth; after a second or successive LOP has been calculated, the latitude and longitude of the observer are displayed on the LED. Refer not to FIG. 4, which is an overall drawing of another embodiment of the invention. This drawing shows a fully automated version of the ARS in which a loop antenna M is used to determine the azimuth of a preprogrammed radio frequency signal from a manmade satellite O for which the ephemerides are known. A radio receiver D identifies the signal, at which time the electronic reading from an inclinometer F is digitized by the A/D conversion board D and the reverse calculation is made by the microprocessor H, and from the azimuth an altitude is obtained, and the sight reduction is completed and graphically presented as above.

Sample software described above for converting numerous individual digitized voltage readings to degrees and averaging them is attached as Appendix I.

FIG. 5 depicts steps of the Appendix I and II software which can be used in accordance with a preferred embodiment to obtain a navigational fix. As described above, a wide angle lens focuses light waves from celestial bodies in a portion of the sky onto an array of light sensitive semiconductors (e.g., diodes, CCDs, and so forth) as shown in step 2. The semiconductor array is then able to determine the relative magnitude of each star in step 4. Further, the date and time are read from a processor keeping track of this information, as shown in step 6.

The arcdistance of each body from the array's center is calculated in step 8 so that celestial bodies can be identified a first time from their angular relationship in step 10. Further, in step 12, a tilt sensor output is converted to a digital value for each celestial body which is used in conjunction with each celestial body's calculated arcdistance from the center of field to derive an observed altitude (HO) in step 14. The tilt sensor provides the altitude of the array centroid above the horizon.

Date and time are then corrected for the mean time of the observation in step 16. The body can be identified a second time in step 18 using standard almanac algorithms plus magnitude, and also from its angular relationship to other bodies in the lens field. After deriving a calculated altitude in step 20, a line of position (LOP) is derived in step 22 using the observed altitude and the calculated altitude of a celestial body. The process is repeated on other bright stars (or other bodies) in the lens field as shown in step 26, and a fix is calculated in step 24 using standard almanac algorithms. The coordinates of the newly-derived position are displayed on a display screen, or on a monitor, or the position is depicted on the monitor as a blinking cursor over a geographical information system (e.g., digitized map) as shown in step 28.

Although preferred embodiments of the invention have been described in the foregoing Detailed Description and illustrated in the accompanying Drawings, it will be understood that the invention is not limited to the embodiments disclosed, but is capable of numerous rearrangements, modifications and substitutions of parts and elements without departing from the spirit of the invention. Accordingly, the present invention is intended to encompass all such rearrangements, substitutions and modifications of parts and elements as fall within the spirit and scope of the appended claims.

APPENDIX I

```
10 REM ********** STARTUP SECTION **********
20 CLS:KEY OFF:LOCATE 9,31:PRINT "SIMULATOR PROGRAM"
30 LOCATE 11,23:PRINT "FOR AN AUTOMATED REPEATING SEXTANT"
```

```
40 LOCATE 14,38:PRINT "BY"
50 LOCATE 16,32:PRINT "PETER C. BOULAY"
60 A=TIMER
70 WHILE TIMER < A+3
80 WEND
90 CLS
100 REM      PROGRAM TO SIMULATE "J" SEXTANT
    'OBSERVATIONS;
110 REM  USING RANDOM NUMBERS AS HO;
120 REM  USER SUPPLIES HC, GROUNDSPEED, NUMBER (J) OF
    'OBSERVATIONS
130 REM  AND LEVEL OF TURBULENCE
140 REM  PROGRAM ASSIGNS NEGATIVE VALUES TO HALF OF
    'THE RANDOM NUMBERS
150 CLS
160 RANDOMIZE TIMER
170 REM ********** INPUT SECTION **********
180 INPUT "How many observations? ",J
190 PRINT "Select the level of turbulence: (N)one, (L)ight, (M)oderate;";
200 INPUT "(H)eavy ";T$
210 IF T$ = "N" OR T$ = "n" THEN T = 1
220 IF T$ = "L" OR T$ = "l" THEN T = 1.2
230 IF T$ = "M" OR T$ = "m" THEN T = 1.4
240 IF T$ = "H" OR T$ = "h" THEN T = 1.6
250 IF T=1 THEN U$="None"
260 IF T=1.2 THEN U$ = "Light"
270 IF T=1.4 THEN U$ = "Moderate"
280 IF T=1.6 THEN U$ = "Heavy"
290 INPUT "Do you want to recalculate? (Y or N) "; RECALC$
300 INPUT "Do you want to print the data? (Y or N) "; PRINTER$
310 INPUT "Give your groundspeed in mph: ", SPEED$
320 INPUT "Give the actual altitude (HC) of the observed body: ", B
330 IF B=>10 AND B=<80 GOTO 360
340 PRINT "HC must be between 10 and 80 degrees."
350 GOTO 320
360 CLS
370 IF RECALC$ = "Y" OR RECALC$ = "y" THEN GOSUB 1450
380 REM ********** NON-RECALCULATION SECTION **********
390 GOSUB 540
400 G=F "Beginning time in seconds
410 FOR I=1 TO J STEP 2 'This is the positive number loop
420 X=RND*T+B
430 K=K+X
440 NEXT I
450 FOR I=2 TO J STEP 2 'This is the negative number loop
460 Y=RND*-1*T+B
470 L=L+Y
480 NEXT I
490 GOSUB 540
500 H=F 'Ending time in seconds
```

```
510 TIME=H-G 'Time in seconds for thee observations
520 IF PRINTER$="Y" OR PRINTER$="y" THEN 2020 ELSE 610
530 REM ********** TIMER SECTION **********
540 B$=TIME$
550 C=VAL(LEFT$(B$,2))
560 D=VAL(MID$(B$,4,2))
570 E=VAL(RIGHT$(B$,2))
580 F=C*3600+D*60+E 'tIME IN SECONDS
590 RETURN
600 REM ********** DISPLAY OUTPUT SECTION **********
610 PRINT " Elapsed time to make ";J "observations (in seconds): ";TIME
620 PRINT "HC = ";B
630 PRINT "Turbulence factor: ";U$
640 DIFF=B-((K+L)/J)  'The value for "a"
650 FTPERSEC= (speed*5280)/3600
660 FLYTIME = D(SPEED*5280)/3600
670 PRINT "Groundspeed, in feet per second:  ";FTPERSEC
680 IF DIFF < 0 THEN DIRECTION$="(Away)" ELSE DIRECTION$="(Toward)"
690 PRINT USING "a = ##.###";DIFF,
700 PRINT DIRECTION$
710 PRINT USING "The LOP for these observations is ####.#";DIFF*5280,
720 PRINT " ft. from the DR position."
730 PRINT USING "At ###";SPEED,
740 PRINT "mph groundspeed, this distance is covered ";
750 IF FLYTIME < 0 THEN FLYTIME = FLYTIME*-1
760 PRINT USING "in: ###.##";FLYTIME;
770 PRINT " seconds."
780 PRINT "K= ";K,"L= ";L
790 PRINT "The mean of the positive loop observations is ";K/(J/2)
800 PRINT "The mean of the negative loop observations is ";L/(J/2)
810 R=(K+L)/J
820 PRINT "The mean of all observations is ";R
830 IF RECALC$="Y" OR RECALC$="y" THEN 850 ELSE 1700
840 REM ********** STANDARD DEVIATION SECTION **********
850 FOR I=1 TO J
860 VARARRAY(I)=R-OBSERVARRAY(I)
870 SUMVAR=SUMVAR+VARARRAY(I)^2  'The sum of the squared 'variances
880 NEXT I
890 A=SQR(SUMVAR/J)
900 STDDEV=A
910 IF STDDEV<0 THEN STDDEV=STDDEV*-1
920 FOR I=1 TO J STEP 2
930 IF OBSERVARRAY(I)-B>STDDEV THEN NEWARRAY(I)=0 ELSE NEWARRAY(I)=OBSERVARRAY(I)
940 NEXT I
950 FOR I=2 TO J STEP 2
```

```
960 IF B-OBSERVARRAY(I)>STDDEV THEN NEWARRAY(I)=0
    ELSE NEWARRAY(I)=OBSERVARRAY(I)
970 NEXT I
980 FOR I=1 TO J
990 NEWSUM=NEWSUM+NEWARRAY(I) 'Adds the new observations
1000 NEXT I
1010 FOR I=1 TO J
1020 IF NEWARRAY(I)=0 THEN COUNT=COUNT ELSE
     COUNT=COUNT *1
1030 NEXT I
1040 NEWDIFF=B-(NEWSUM/COUNT)
1050 IF NEWDIFF<0 THEN NEWDIFF=NEWDIFF*-1
1060 GOTO 2410
1070 REM ********** OUTPUT **********
1080 PRINT:PRINT
1090 PRINT
1100 PRINT "Date: ";DATE$
1110 PRINT "Time: ";TIME$
1120 PRINT
1130 LOCATE ,1:PRINT "No"
1140 LOCATE ,6:PRINT "RND",
1150 LOCATE ,14:PRINT "t",
1160 LOCATE ,20:PRINT "HC",
1170 LOCATE ,29:PRINT "HO",
1180 LOCATE ,37:PRINT "Mean",
1190 LOCATE ,47:PRINT "Var",
1200 LOCATE ,60:PRINT "Recalc HO"
1210 PRINT "------------------------------------------------------------"
1220 FOR I=1 TO J
1230 LOCATE ,1:PRINT I,
1240 LOCATE ,5:PRINT USING "#.####";RND,
1250 LOCATE ,13:PRIINT USING "#,#";T,
1260 LOCATE ,18:PRINT USING "##.####";B,
1270 LOCATE ,27:PRINT USING "##.####";OBSERVARRAY(I),
1280 LOCATE ,36:PRINT USING "#.####";R,
1290 LOCATE ,47:PRINT USING "##.####";VARARRAY(I),
1300 LOCATE ,60:PRINT USING "##.####";NEWARRAY(I)
1310 NEXT I
1320 PRINT:PRINT
1330 PRINT "The standard deviation of the observations is: ";STDDEV
1340 PRINT COUNT; "of the ";J;"observations fall within one standard
     deviation."
1350 PRINT "The recalculated mean is ";NEWSUM/COUNT
1360 PRINT:PRINT
1370 PRINT USING "The recalculated LOP is ####.#";NEWDIFF*5280,
1380 PRINT "ft.";DIRECTION$;" from the DR position."
1390 IF DIFF<0 THEN DIFF=DIFF*-1
1400 Z=(DIFF*5280)-(NEWDIFF*5280)
1410 PRINT USING "This is a difference of plus or minus ####.#";Z,
```

```
1420 PRINT " ft. over the original calculation."
1430 GOTO 1700
1440 REM **********RECALCULATION SECTION**********
1450 OPTION BASE 1
1460 DIM OBSERVARRAY(J) 'This array will contain all of the
     'observations.
1470 DIM VARARRAY(J) 'This array will contain the variances from the
     'mean
1480 DIM NEWARRAY(J)
1490 DIM RNDARRAY(J)
1500 GOSUB 540
1510 G=F 'Beginning time in seconds
1520 FOR I=1 TO J STEP2 'This is the positive number loop
1530 RNDARRAY(I)=RND
1540 X=RND*T+B
1550 OBSERVARRAY(I)=X
1560 K=K+X
1570 NEXT I
1580 FOR I=2 TO J STEP 2 'This is the negative number loop
1590 RNDARRAY(I)=RND
1600 Y=RND*-1*T+B
1610 OBSERVARRAY(I)=Y
1620 L=L+Y
1630 NEXT I
1640 GOSUB 540
1650 H=F "Ending time in secons
1660 TIME=H-G "Time in seconds for the observations
1680 REM ********** CHOICE SECTION **********
1680 IF PRINTER$='Y' OR PRINTER$ = "y" THEN 1750 ELSE 610
1690 GOSUB 610
1700 PRINT:PRINT
1710 PRINT:PRINT
1720 INPUT "Do you want to run more simulations? (Y or N) ";MORE$
1730 IF MORE$ ="Y" OR MORE$ = "y" THEN 1740 ELSE END
1740 IF RECALC$="Y" OR RECALC$="y" THEN 1750 ELSE 150
1750
1760 REM ********** RECALC/PRINT SECTION **********
1770 LPRINT DATE$
1780 LPRINT TIME$
1790 LPRINT
1800 LPRINT "Elapsed time to make ";J "observations (in seconds):
     ";TIME
1810 LPRINT "HC = ";B
1820 LPRINT "Turbulence factor: ";U$
1830 DIFF=B-((K+L)/J) 'The value for "a"
1840 FTPERSEC = (SPEED*5280)/3600
1850 FLYTIME = (DIFF*5280)/FTPERSEC
1860 LPRINT "Groundspeed, in feet per second: ";FTPERSEC
1870 IF DIFF<0 THEN DIRECTION$="(Away)" ELSE DIRECTION$
     = "(Toward)"
```

```
1880 LPRINT USING "a = ##.###";DIFF,
1980 LPRINT DIRECTION$
1900 LPRINT USING "The LOP for these observations is ####.#";DIFF*5280,
1910 LPRINT "ft. from the DR position."
1920 LPRINT USING "At ###";SPEED,
1930 LPRINT " mph groundspeed, this distance is covered ";
1940 IF FLYTIIME < 0 THEN FLYTIME =FLYTIME *-1
1950 LPRINT USING "in: ###.##";FLYTIME;
1960 LPRINT " seconds."
1970 LPRINT "K= ";K,"L= ";L
1980 LPRINT "The mean of the negative loop observations is ";L/(J/2)
1990 R=(K+L)/J
2000 LPRINT "The mean of all observations is ";R
2010 GOTO 1720
2020 LPRINT "The mean of the positive loop observations is ";K/(J/2)
```

I claim:

1. An automated, repeating sextant comprising:
   means for receiving a signal from a celestial body;
   means for measuring movement of the sextant about a first axis as a first signal which establishes an artificial horizon;
   means for detecting a signal received from a celestial body and an angle of incidence of the received signal on the detecting means, said angle of incidence being output by said detecting means;
   means responsive to plural values of said first signal and said angle of incidence for determining a mean altitude of the celestial body, and determining a line of position using said mean altitude and stored data ephemerides for the celestial body; and,
   means for displaying the line of position.

2. Repeating sextant according to claim 1, wherein said receiving means is a lens contained within a protective globe.

3. Repeating sextant according to claim 1, wherein said means for displaying is a digitized map of a given geographical area, and said line of position is placed over said map.

4. Repeating sextant according to claim 1, wherein said means for displaying is a video display terminal.

5. Repeating sextant according to claim 1, wherein said means for displaying is a liquid crystal display.

6. Repeating sextant according to claim 1, wherein said means for displaying is a light emitting diode display.

7. Repeating sextant according to claim 1, wherein said determining means further includes means for providing an updated date and time from which a mean time of a given observation of the celestial body during said line of position determination is derived.

8. Repeating sextant according to claim 1, wherein all information required to display a line of position is determined automatically.

9. Repeating sextant according to claim 1, wherein a line of position is determined for at least two different celestial bodies to provide a position fix of the sextant, said position fix being displayed on said displaying means.

10. Repeating sextant according to claim 1, wherein said mean altitude is statistically enhanced.

11. Repeating sextant according to claim 1, wherein said receiving means is a loop antenna.

12. Repeating sextant according to claim 11, wherein said celestial body is a manmade satellite which emits a radio frequency signal, and said detecting means is a radio frequency receiver which detects an angle of incidence of the radio frequency signal received by said loop antenna from said manmade satellite to determine an azimuth of said manmade satellite.

13. Repeating sextant according to claim 1, further including means for measuring roll of the sextant about a second axis, perpendicular to said first axis, as a second signal.

14. A repeating sextant according to claim 13, wherein said first and second signals are analog signals, said sextant further including means for converting said first and second signals to digital signals for input to said altitude and line of position determining means.

15. Repeating sextant according to claim 13, wherein said detecting means further detects a magnitude of said received signal to assist in identifying said celestial body, said magnitude being input to said determining means for deriving a calculated altitude of the celestial body from said stored data ephemerides.

16. Repeating sextant according to claim 15, wherein said calculated altitude is determined by applying stored Chebyshev formulae to said stored data ephemerides.

17. Repeating sextant according to claim 15, wherein said detecting means further includes an array of light sensitive semiconductors.

18. Repeating sextant according to claim 17, wherein said light sensitive semiconductors are light sensitive diodes.

19. Repeating sextant according to claim 17, wherein said light sensitive semiconductors are CCDs.

20. Repeating sextant according to claim 13, wherein said sextant is a portable, handheld device which is manually directed toward the celestial body.

21. Repeating sextant according to claim 20, wherein said means for measuring movement about a second axis inhibits said first signal when said second signal exceeds a first predetermined threshold.

22. Repeating sextant according to claim 20, wherein said receiving means is a telescope.

23. Repeating sextant according to claim 22, wherein said detecting means includes an array of light sensitive semiconductors.

24. Repeating sextant according to claim 23, wherein said detecting means inhibits operation of said sextant when an image of the celestial object is not received by said array of light sensitive semiconductors.

25. Repeating sextant according to claim 24, wherein said line of position is determined by comparing said mean altitude with an altitude of the celestial body calculated from said stored ephemerides.

26. A fully automated, repeating sextant comprising:
a lens for receiving a signal from a celestial body;
a first inclinometer for measuring movement of the sextant about a first axis as a first signal which establishes an artificial horizon;
a second inclinometer for measuring roll of the sextant about a second axis, perpendicular to said first axis, as a second signal;
a semiconductor array for detecting the magnitude of at least one signal received from a celestial body and an angle of incidence of the received signal on the semiconductor array, said magnitude and angle of incidence being output by said detecting means;
means responsive to plural values of said first signal and said angle of incidence for determining a mean altitude of the celestial body, and said magnitude being input to said determining means for deriving a calculated altitude of the celestial body from stored data ephemerides, a line of position of the celestial body being determined from said mean altitude and said calculated altitude; and,
means for displaying the line of position.

27. Repeating sextant according to claim 26, wherein said first and second signals are analog signals which represent an altitude of a centroid of the semiconductor array above a true horizon as determined by the first inclinometer, said sextant further including means for converting said first and second signals to digital signals for input to said altitude and line of position determining means.

28. Repeating sextant according to claim 26, wherein said calculated altitude is determined by applying stored Chebyshev formulae to said stored data ephemerides.

29. An automated, repeating sextant comprising:
an antenna for receiving a signal from a celestial body which emits a radio frequency signal;
a first inclinometer for measuring movement of the sextant about a first axis as a first signal which establishes an artificial horizon;
a second inclinometer for measuring roll of the sextant about a second axis, perpendicular to said first axis, as a second signal;
a radio frequency receiver which identifies the radio frequency signal received by said antenna from said celestial body to determine an azimuth of said celestial body, said azimuth being output by said radio frequency receiver;
means responsive to plural values of said first signal and said azimuth for determining a mean altitude of the celestial body, and determining a line of position using said mean altitude and stored data ephemerides for the celestial body; and,
means for displaying the line of position.

30. Repeating sextant according to claim 29, wherein a line of position is determined for at least two different celestial bodies to provide a position fix of the sextant, said position fix being displayed on said displaying means.

31. A portable, handheld repeating sextant which is manually directed toward a celestial body comprising:
a telescope for receiving a signal from a celestial body;
a first inclinometer for measuring movement of the sextant about a first axis as a first signal which establishes an artificial horizon;
a second inclinometer for measuring roll of the sextant about a second axis, perpendicular to said first axis, as a second signal, said second inclinometer inhibiting said first signal when said second signal exceeds a first predetermined threshold;
a semiconductor array for detecting the magnitude of at least one signal received from a celestial body and an angle of incidence of the received signal on the semiconductor array, said magnitude and angle of incidence being output by said detecting means;
means responsive to plural values of said first signal and said angle of incidence for determining a mean altitude of the celestial body, and said magnitude being input to said determining means for deriving a calculated altitude of the celestial body from stored data ephemerides, a line of position of the celestial body being determined from said mean altitude and said calculated altitude; and,
means for displaying the line of position.

32. A repeating sextant according to claim 31, wherein at least one of said first and second signals is an analog signal, said sextant further including means for converting said analog signal to a digital signal for input to said altitude and line of position determining means.

33. Repeating sextant according to claim 32, wherein said mean altitude is statistically enhanced.

34. Repeating sextant according to claim 32, wherein a line of position is determined for at least two different celestial bodies to provide a position fix of the sextant, said position fix being displayed on said displaying means.

35. Repeating sextant according to claim 34, wherein said semiconductor array includes light sensitive semiconductors.

36. A method for determining a line of position from the location of a celestial body comprising the steps of:
receiving a signal from a celestial body;
measuring movement of the sextant about a first axis as a first signal which establishes an artificial horizon;
detecting a signal received from a celestial body using a semiconductor array and an angle of incidence of the received signal on the semiconductor array, said angle of incidence being output by said semiconductor array;

determining plural values of said first signal and said angle of incidence and calculating a mean altitude of the celestial body;

determining a line of position using said mean altitude and stored data ephemerides for the celestial body; and, displaying the line of position.

37. Method according to claim 36, wherein a line of position is determined for at least two different celestial bodies to provide a position fix of the sextant, said position fix being displayed.

38. A method for determining a line of position from the location of a celestial body comprising the steps of:

receiving a signal from a celestial body;

measuring movement of the sextant about a first axis as a first signal which establishes an artificial horizon;

detecting a signal received from a celestial body using a radio frequency receiver to determine an azimuth of the celestial body, said azimuth being output by said radio frequency receiver;

determining plural values of said first signal and said azimuth and calculating a mean altitude of the celestial body;

determining a line of position using said mean altitude and stored data ephemerides for the celestial body; and, displaying the line of position.

* * * * *